United States Patent [19]

Cook

[11] 4,424,640
[45] Jan. 10, 1984

[54] BINARY ANIMAL TRAP

[76] Inventor: Rodney G. Cook, 1500 California Ave., Camden, Ark. 71701

[21] Appl. No.: 294,559

[22] Filed: Aug. 20, 1981

[51] Int. Cl.³ .............................................. A01M 23/26
[52] U.S. Cl. ............................................ 43/58; 43/93
[58] Field of Search .................... 43/58, 85, 88, 92, 93

[56] References Cited

U.S. PATENT DOCUMENTS 3,871,124  3/1975  Cook ........................................ 43/88
4,308,682  1/1982  Cesar ........................................ 43/88

Primary Examiner—Nicholas P. Godici
Assistant Examiner—Charles L. Willis
Attorney, Agent, or Firm—Stephen D. Carver

[57] ABSTRACT

A binary animal trap comprising a frame housing and a separate jaw carriage adapted to be releasably coupled to the housing. An internal, primary trigger assembly may be set to temporarily, yieldably latch the jaw carriage within the frame assembly. Thrust springs which are maintained in a compressed position when the trap is in the "set" mode will rapidly expel the carriage when the trap is triggered. The carriage preferably comprises a pair of cooperating jaw members which are activated by jaw springs released by a second trigger system only after activation of the primary trigger assembly. When the trap is in the "set" mode the carriage jaw members rest upon the primary trigger means, and contact by an animal with the jaws activates the primary trigger. Substantially contemporaneously with expulsion of the jaw carriage from the separate housing, inertial contact of the jaws with a portion of the jaw springs results in complete release of the jaw springs, forcibly snapping the jaws shut.

27 Claims, 4 Drawing Figures

BINARY ANIMAL TRAP

BACKGROUND OF THE INVENTION

The present invention relates to animal traps. More particularly, this invention is directed to animal traps of the type characterized by jaw members which, after triggering of the trap, are projected toward the animal to be captured. United States Class 43, Subclasses 63, 85–88, 90 and 92 are believed most relevant.

In the prior art a vast array of animal traps have been devised. Typical animal traps include some form of spring biased jaw members adapted to compressively capture an animal (or portion of an animal) therebetween. Usually some form of centrally located trigger mechanism is employed to activate the jaws in response to animal contact. Simple prior art devices of this general description are disadvantageous in that they often damage the pelt of the animal to be trapped, or otherwise injure or maim the animal. Moreover, such traps may cause the animal to suffer unnecessarily prior to its death. Besides the foregoing problems inherent with basic prior art traps, such technology is usually characterized by relatively insensitive trigger mechanisms. A more basic weakness of such designs is that the natural tendency of the animal to quickly attempt to withdraw its paw or leg after the trigger is tripped often enables it to avoid capture by evading the rapidly closing jaws.

Numerous attempts have been made to improve trap trigger mechanisms. Moreover, several prior art attempts have been made to include some form of apparatus for moving the closing jaws toward the animal to overcome the tendency for the animals to withdraw their paws or legs. Examples of prior art in which jaws or some form of equivalent mechanisms are simultaneously closed and substantially concurrently projected toward the animal may be seen in previously issued U.S. Pat. Nos. 1,421,610; 2,123,789; 1,191,909; and 2,292,695. In my previously issued U.S. Pat. No. 3,871,124 I have explained many of the problems with such prior art traps. In that invention I provided a trap in which the basic jaw mechanism was thrust vertically upwardly relative to the lower housing of the trap in an attempt to pursue the elusive animal as the spring jaws are closing.

However, even where the basic jaw mechanism is thrust toward the animal after detonation, prior art designs are often severely limited by the unitary character of their construction. It is extremely important for traps of this nature to quickly and reliably pursue the withdrawing animal, while at the same time insuring that the jaws close in a correct position relative to the animal to be captured. Therefore a binary trap in which the jaw mechanism is completely expelled from the trap frame for subsequent capture of the animal is suggested.

SUMMARY OF THE INVENTION

The present invention comprises a binary animal trap consisting of a housing which is adapted to be concealed in an area likely to be visited by a target animal, and a separate jaw carriage assembly adapted to be releasably coupled to the housing. Thrust spring apparatus is employed to bias the jaw carriage relative to the housing. A primary trigger latch assembly disposed within the housing releasably couples the jaw carriage to the trap frame, and the jaw carriage is maintained in the "set" position against predetermined tension from the thrust springs until the trigger assembly is tripped by an animal contacting the carriage jaws.

Preferably the jaw carriage includes a pair of generally planar, spaced-apart jaws which are hingeably coupled to opposite sides of the carriage. Jaw springs associated with the jaw carriage are provided to forcibly close the jaws when the trap is sprung. However, when the trap is in the "set" position, the jaws are untensioned. At this time the jaw springs are retained out of contact with the jaws in a tensioned, "set" position by pin members which penetrate loop portions of the jaw springs. When the jaw carriage is properly positioned relative to the trap housing, the "floating" jaws will lightly contact a portion of the primary trigger assembly. When an animal subsequently pressures the trap jaws the trigger assembly will activate, and the carriage will be released by the trigger latch assembly. After its release the carriage is rapidly thrust out of the housing by the thrust springs, which quickly return to their untensioned rest position. During this "thrust interval", inertial contact of the jaw members with an intermediate portion of the jaw springs results in the release of the jaw springs, forcibly closing the jaws. "Secondary triggering" is encouraged by normally biasing the jaw spring retention means toward a "release" position.

Therefore it is an object of the present invention to provide a binary animal trap comprising a housing and a separate, cooperating jaw carriage assembly adapted to be rapidly expelled upon triggering.

Another object of the present invention is to provide a binary trap of the character described adapted to humanely and cleanly capture animals.

Another object of the present invention is to provide a binary trap of the character described adapted to preserve the pelt of the captured animal without damage or disfigurement.

A still further object of the present invention is to provide a two stage trigger system whereby the jaws of the trap are activated after the jaw carriage is in motion.

A still further object of the present invention is to provide a trap wherein the capture jaws pursue the target animal.

Yet another object of the present invention is to provide a binary trap of the character described in which attempts by an animal to subsequently withdraw its captured leg or paw results in increased tightening of the closed jaws.

Yet another object of the present invention is to provide a binary animal trap of the character described which is ideally suited for capture of a variety of animals.

Another object is to provide a reliable two stage triggering system for an animal trap.

A related object is to provide an inertial trigger mechanism, particularly one suited for binary traps.

These and other objects and advantages of the present invention, along with features of novelty appurtenant thereto will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout whereever possible to indicate like parts in the various views.

DETAILED DESCRIPTION OF THE DRAWINGS

Figure 1:
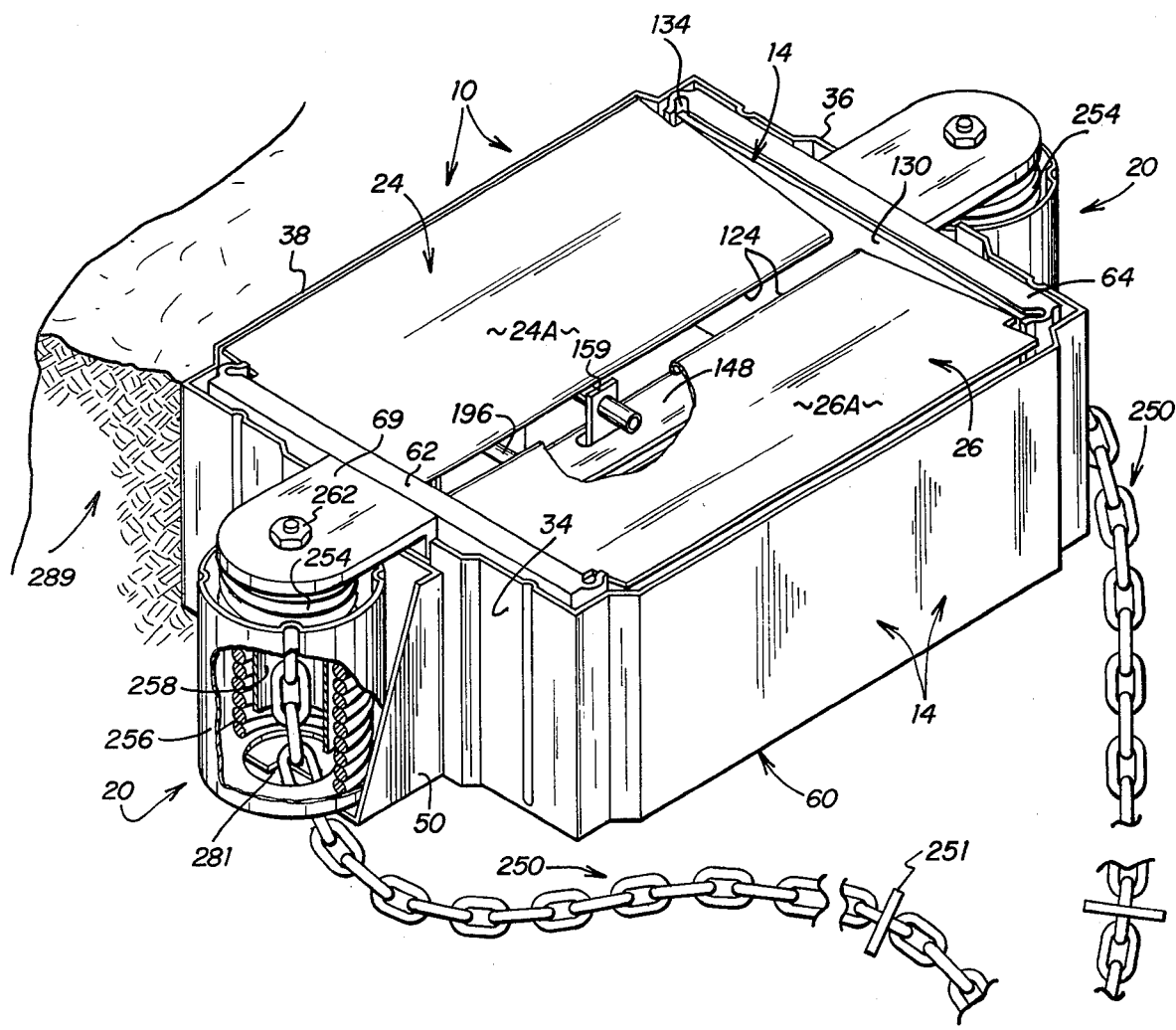
FIG. 1 is an isometric, pictorial view of a binary trap constructed in accordance with the teachings of the present invention, illustrating the trap in the set mode in which the jaw carriage is latchably received within the associated housing, with parts thereof broken away or shown in section for clarity.

With reference now to the appended drawings, a binary animal trap constructed in accordance with the teachings of the invention is generally designated by the reference numeral 10. Binary trap 10 comprises a trap housing, generally designated by the reference numeral 12, and a separate, cooperating jaw carriage assembly, generally designated by the reference numeral 14. In FIG. 1 the trap is illustrated in the "set" mode wherein jaw carriage 14 is received within frame assembly 12. When in the "set" mode, jaw carriage 14 is restrained within housing 12 by the primary trigger assembly, generally designated by the reference numeral 16. The trigger assembly 16 essentially "latches" jaw carriage 14 within frame 12 against predetermined tension from a pair of thrust spring assemblies, generally designated by the reference numeral 20. When the trap 10 is detonated, the jaw carriage 14 is rapidly expelled upwardly from the housing assembly 12. Substantially instantaneously after expulsion from housing frame 12 (by thrust spring assemblies 20) the separate, cooperating trap jaws 24, 26 will be forced together when jaw springs, generally designated by the reference numeral 30, are subsequently released to force the jaws shut.

Trap housing means 12 comprises a rigid, generally cubicle frame 32 preferably comprised of sheet metal or the like. Box-like frame 32 comprises a pair of spaced-apart ends 34, 36 which are integral with sides 38, 40. Ends 34 and 36 and sides 38 and 40 extend perpendicularly from a lower, planar shelf 42 adapted to receive floor 44 which mounts trigger assembly 16. Each of the frame walls or sides are provided with a plurality of reinforcement grooves to strengthen the apparatus. End walls 34, 36 are each provided with thrust spring mounting brackets 48. Each mounting bracket includes webbed, side walls 49, 50 which terminate in a lower shelf portion 52 adapted to receive the thrust spring assemblies 20.

The jaw carriage assembly 14 comprises a generally box-like, rigid frame generally designated by the reference numeral 60. Carriage frame 60 comprises a pair of ends 62, 64 which are spaced-apart in generally parallel relation by side walls 66, 68 which are of somewhat lower height than the ends 62, 64. Generally L-shaped thrust brackets 69 project outwardly from end walls 62, 64, and are adapted to be aligned above thrust brackets 48 previously discussed, with thrust spring assemblies 20 being compressed therebetween.

Narrow, elongated shelves 72,74 are respectively defined as by stamping or the like upon the tops of jaw carriage side walls 68, 66 respectively. Each shelf 72,74 mounts a plurality of rigid, spaced-apart, apertured pairs of hinge members 80 which project upwardly from the shelves 72 or 74. It will be noted that the generally planar, rigid metallic jaws 24, 26 terminate in outer edges 24B, 26B from which similar apertured, rigid, spaced-apart hinge members 88 downwardly project. Each of the jaws 24, 26 are adapted to be hingeably coupled to corresponding jaw carriage frame side walls 68 or 66 respectively by an elongated axle 84 which is adapted to penetrate the orifices 81,83 defined in the hinge members 80 or 88. Axle 84 also penetrates and restrains the jaw spring assembly 30 in proper position relative to jaws 24 or 26 and the jaw carriage side walls 68 or 66.

It will be noted that the jaw springs 30 comprise spaced-apart, coiled sections 90, 91 which terminate at their outermost ends in downwardly projecting portions 94, 95 which are adapted to engage the inner sides of jaw carriage frame assembly side walls 68, 66. An intermediate jaw spring portion 98 joins segments 90 and 91. Intermediate jaw spring portion 98 terminates in a central, integral loop portion 99 which is oriented perpendicularly with respect to intermediate portion 98. When the assembled trap 10 is disposed in the "set" position, jaw spring intermediate portion 98, which is normally tensioned toward contact with the underside of the jaws, will be restrained from contact therewith.

Jaw springs 30 are restrained from biasing the jaws when the assembled trap 10 is disposed in the "set" mode by catch pin assemblies 102, which are centrally secured upon jaw carriage frame sides 68, 66 immediately below set slots 104. During setting of the apparatus the jaws 24 or 26 are manually compressed downwardly into the apparatus, whereupon contact with the inside lower surfaces of the jaws upon jaw spring intermediate portions 98 will rotate and thrust the jaw spring terminal loop portions 99 downwardly and through set slots 104, which are positioned immediately above catch pin assemblies 102. Each of the catch pin assemblies include a generally cubicle housing 106 in which an elongated catch pin 108 is restrained for limited axial displacement relative thereto. As best viewed in FIG. 3, pins 108 may be manually displaced upwardly by contact with pin heads 109 against predetermined tension from an internal coaxial spring 111. In this manner the uppermost portion of pins 108 may be urged into a penetrating, restraining relationship relative to jaw spring terminal loops 99. When the jaw spring assemblies 30 are "set" in this fashion, the jaws 24, 26 will essentially "float", and they will not be spring biased toward the capture position until the second trigger apparatus is actuated, as will later be discussed.

The jaws 24, 26 include spaced-apart generally parallel edges 120, 121 which extend from sides 24B, 26B to curved jaw edges 124. Rigid, centrally located guide bosses 127 project outwardly from jaw sides 120, 121 for engagement with slots 126 defined in a pair of generally rectangular, rigid, planar synchronization plates 130. The synchronization plates are restrained within guide grooves 134 defined in the corners of the jaw carriage frame. Since jaw member guide bosses 127 track within synchronization plate slots 126, movement of the jaws 24 or 26 will be synchronized. The synchronization plates are free to move reciprocally up and down with respect to the jaw carriage frame 60 within grooves 134. Tracking is encouraged by preferably teflon bushings 136 mounted over jaw guide bosses 127 for slidable displacement within synchronization plate slots 126.

Figure 2:
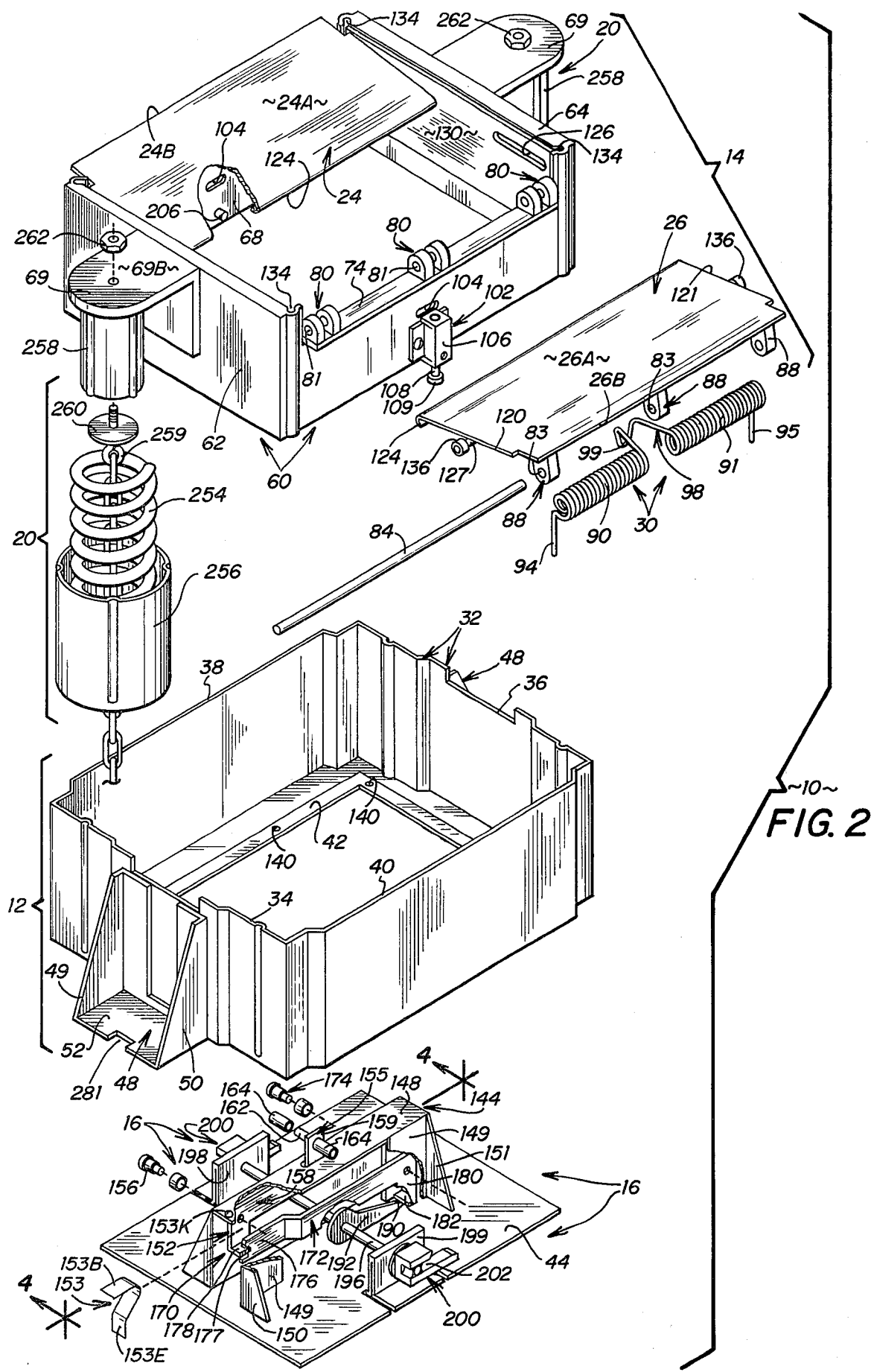
FIG. 2 is an exploded, isometric view of the invention with parts thereof broken away or shown in section for clarity, and with parts thereof omitted for brevity.
Figure 4:
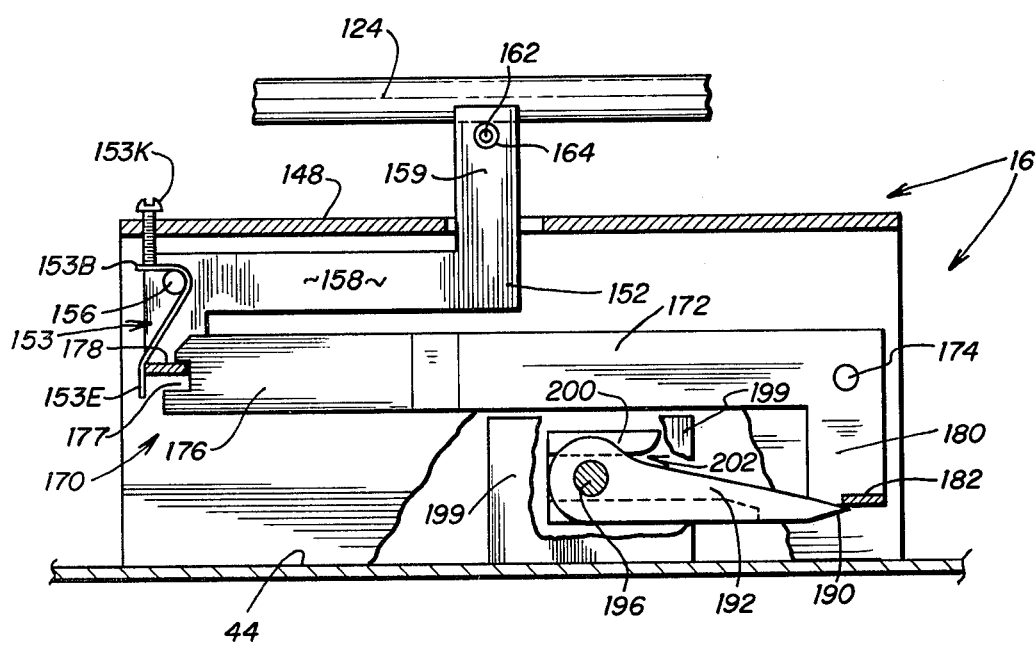

With primary reference now to FIGS. 2 and 4, when the trap 10 is in the "set" mode, the jaw carriage assembly 14 is releasably latched within the housing assembly 12 by the primary trigger assembly 16. As indicated previously, trigger assembly 16 is mounted immediately below housing frame bottom 42 by coupling plate 44 thereto with a plurality of screws (not shown) received within suitable orifices 140. The trigger assembly floor 44 centrally mounts a generally rectilinear, box-like trigger mounting frame assembly generally designated by the reference numeral 144, which includes an elongated, rectangular, flat top 148 supported by sides 149 and reinforced by terminal webs 150, 151. A first trigger lever 152 is pivotally mounted within assembly 144 by a pivot screw 156. This offset first trigger lever 152 comprises a major portion 158 which terminates internally of housing 144 in an upwardly projecting portion 159 which mounts a transverse, trigger contact 162, which in turn coaxially receives trigger contact bearings 164. The first trigger member 152 terminates in a downwardly projecting, offset portion 170 which engages a second trigger lever generally designated by the reference numeral 172.

The first trigger lever 152 is normally biased by an arcuate spring 153 which is retained in position about pivot 156 by contact of its top 153B against the underside of a trigger tension adjustment screw 153K (FIG. 4), and contact of its bottom 153E against the outermost edge of first lever tab 178. Screw 153K is received through the top 148 of trigger mounting frame 144. Thus spring 153 normally biases the first trigger lever vertical portion 159 upwardly, outwardly from housing top 148. To trigger the trap 10, predetermined tension from spring 153 must be overcome by contact of the animal with either or both of the jaws 24, 26, the edges 124 of which depress projection 159.

The second trigger lever 172 is pivotally mounted within enclosure 144 by a pivot screw 174, and offset end 176 thereof terminates in a fork portion 177 which engages horizontal tab 178 projecting from first trigger lever 158. The opposite end 180 of second trigger lever 172 projects generally downwardly and terminates in a horizontal, outwardly projecting tab 182 positioned immediately over and in contact with the forward, tapered wedge shaped end 190 of a third trigger lever 192.

Figure 3:
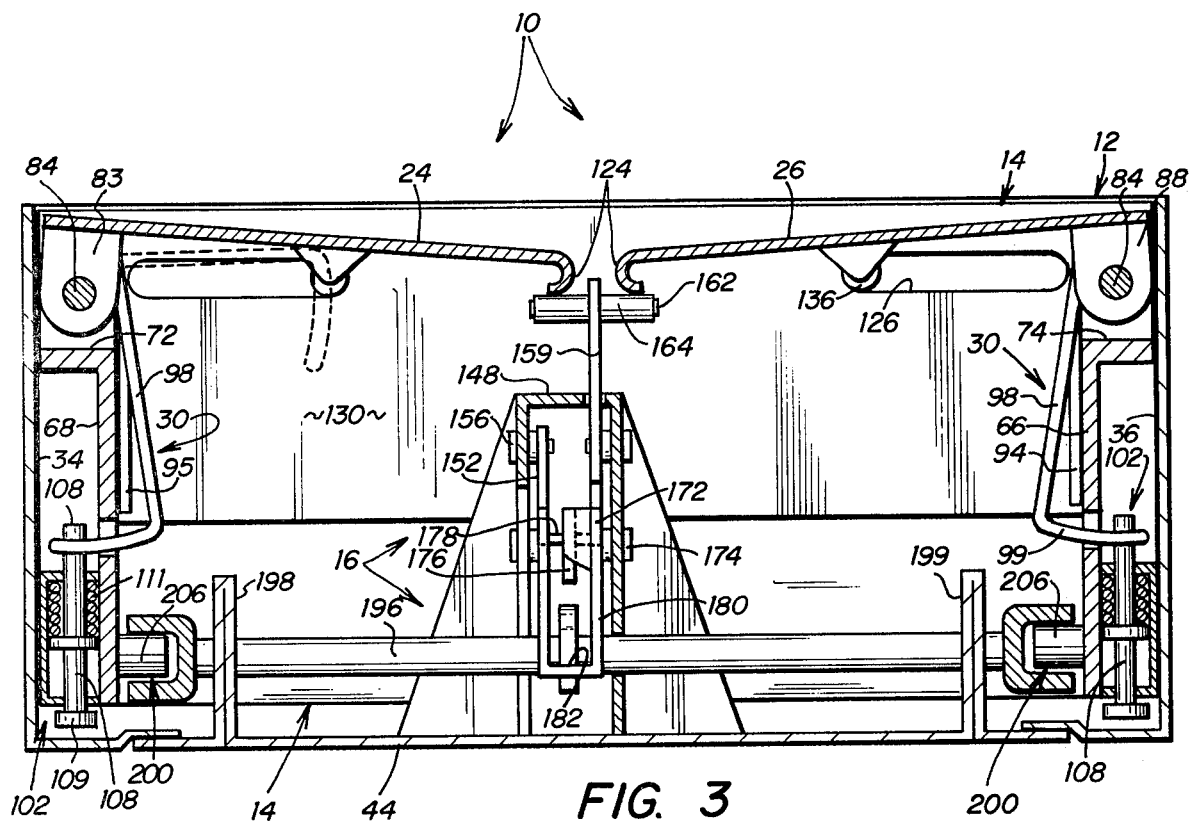
FIG. 3 is a transverse sectional view of the trap illustrated in a "set" position, with parts thereof broken away or omitted for clarity; and, FIG. 4 is a longitudinal sectional view of the primary trigger assembly taken generally along lines 4—4 of FIG. 2, with parts thereof broken away or omitted for clarity.

Third trigger lever 192 is pivotally mounted by an elongated axle 196 extending transversely across in generally parallel relation with respect to shelf 44 between support brackets 198, 199 through which it is journaled for rotation. Axle 196 terminates on opposite outer edges of the mounting brackets 198, 199 in spaced-apart, cooperating, generally channel shaped dogs 200. Each of the dogs 200 forms a channel, generally designated by the reference numeral 202 (FIG. 4) which, when the assembled trap is disposed in the "set" mode, controllably receives jaw carriage retention bosses 206 (FIGS. 2,3). Each of the rigid retention bosses 206 extend from the inner surface of jaw carriage side walls 66, 68 immediately below the jaw spring set slots 104.

The primary trigger assembly 16 is detonated when first trigger lever portion 159 is depressed downwardly (as viewed in FIG. 2). It will be apparent that downward deflection of the trigger lever portion 159 will rotate trigger lever 152 to release tab 178 from fork 177. Release of the second trigger lever 172 forces its retention tab 182 away from and out of contact with the wedge shaped end 190 of third trigger lever 192, whereupon thrust spring assemblies 20 are free to force the jaw carriage assembly 14 out of the trap when dogs 200 obligingly rotate to free jaw carriage retention bosses 206.

Each thrust spring assembly 20 prefereably comprises resilient, coiled springs 254 which are received within a separate generally tubular housing 256, the bottom of which is positioned, when the trap is in the "set" mode, upon thrust spring bracket shelf 52 (on housing frame 12). Springs 254 are preferably coaxially centered about reduced diameter tubular thrust spring guides 258 which project downwardly from jaw carriage thrust brackets 69. The thrust spring guides are retained by washers 260 penetrated by conventional threaded eyelets 259, which are secured to brackets 69 by nuts 262. The eyelets are coupled to terminal ends of retainer chains 250, and it will be observed that a predetermined length of retainer chains 250 will be temporarily stored within the thrust spring assembly. Clearance is provided by notches 281 defined within shelf portions 52 of the thrust spring brackets 48. Preferably the chains may terminate in a common point, which point may be secured to a stationary object to prevent loss of the carriage assembly.

As best viewed in FIG. 3, when the trap is disposed in the "set" mode, the innermost, curved edges 124 of the jaws 24 or 26 delicately rest upon tubular bearings 164 which are fastened to the first trigger lever vertical portion 159. It will thus be apparent that when the animal to be captured pressures jaw surfaces 24A or 26A upon discovery of trap 10, downward displacement of the "floating" jaws 24 or 26 upon the first trigger lever will release trigger assembly 16, and the first trigger function will be rapidly completed.

Substantially instantaneously thereafter, the jaw springs 30, which previously have been restrained by the latch spring assemblies 102, will detonate. This second trigger system is activated by inertial contact of the previously floating jaws 24 or 26 with the intermediate jaw spring portions 98. Intermediate jaw spring portions 98 (FIG. 3) project slightly towards the center of the jaw carriage. Jaw contact will force the spring terminal loop portions 99 slightly outwardly with respect to the set slots 104. As mentioned previously, the spring biased catch pins 108 will be released upon deflection of jaw spring terminal ends 99, whereupon their internal springs 111 will withdraw them and free jaw spring terminal loops 99. As soon as the jaw springs 30 are freed in this fashion, the spring intermediate portions 98 will rapidly assume their "triggered position", forcing the jaws into a substantially parallel, capturing position about a portion of an animal to be captured.

Setting of the Trap

Jaws 24, 26 are first "set" by restraining jaw springs 30. The jaw carriage assembly 14 may be grasped manually by the trapper, and forcible pivoting of jaws 24, 26 downwardly within the jaw carriage will force jaw spring terminal loops through the set slots 104 provided in the jaw carraige frame. When the set slots 104 are thus penetrated, manual displacement of catch pins 108 may be effectuated by depressing pin heads 109. Once springs 30 are restrained, the jaws 24, 25 will be free to "float" within the jaw carriage 14, which must then be coupled to housing 12.

Jaw carriage 14 should then be turned upside down, with the jaws 24, 26 assuming a "closed" position.

Housing 23 must also be positioned upside-down. The trigger dogs, the dog shaft and the third trigger lever should be in the fully "tripped" position. (In the latter position dogs 200 will operatively receive carriage bosses 206).

The trap housing is then positioned so the chains are in their respective notches provided in the trap housing thrust spring brackets. With the chains held taut, the trap housing is then lowered along the chains to contact with the thrust spring housings, and the trap housing is then manually forced against yieldable pressure of the thrust springs down over the jaw carriage the limit of its travel. While holding in this position the jaws are then allowing the second trigger lever to fall by gravity into its "set" position. The jaws are then released. The chains are then placed into their respective thrust spring housing assemblies (while the trap remains in the inverted position). The retainer washers are inserted to prevent the temporarily stored portion of chains from falling from the thrust spring housings when the trap is turned upright. A pre-determined length of chain is thus stored, this representing the maximum amount which can easily be received by the space available in said housings in order to allow the jaw carriage its maximum upward thrust.

During setting of the trap one object is to properly mesh the bosses 206 (projecting inwardly from the sides of the jaw carriage) in engagement with dogs 200 previously discussed. When the jaw carriage has been carefully depressed as far as possible the bosses 206 will be received within dogs 200. Since the apparatus is upside down at this point, by then lightly touching the jaws 24 or 26 to actuate the first lever arm (by contacting bearings 164), gravitational forces will allow the second and third lever arms 172, 192 respectively to drop into the set mode wherein they assume the set state previously described. The jaws may then be released by the trapper and the entire apparatus may be rotated to its operative position.

The "set" trap should preferably then be positioned so that it is concealed within the ground by burying it in ground 289 (FIG. 1). Afterwards the jaws 24 or 26 may be concealed, or bait may be placed upon upper surfaces 24A, 26A. Upon the slightest touch of a target animal, pressure upon jaws 24 or 26 will depress first trigger lever 152, thereby actuating the primary trigger assembly 16. Dogs 200 will immediatly release bosses 206, and the thrust spring assemblies 20 will expel the jaw carriage assembly 14. Outward travel of the carriage assembly may be limited by the chains.

Jaws 24, 26 will then inertially contact jaw spring intermediate portions 98, and jaw spring loops 99 will be released from the catch pin assemblies 102 as previously discussed. The jaws 24, 26 will then be forcibly closed about the animal by jaw springs 30 and the animal will hopefully be captured. It will be noted, for example, that if the animal subsequently attempts to withdraw his captured paw, attempted withdrawal will force the jaws upwardly with respect to the jaw carriage, so that attempts to withdraw will result in the tightening of the jaws. However, because of the smooth configuration of jaw edges 124, it will be apparent that damage and pain to the animal will be minimized.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A binary animal trap comprising:
   trap housing means adapted to be concealed in an area likely to be visited by a target animal;
   separate jaw carriage means adapted to be temporarily matingly coupled to said housing means for capturing a target animal;
   primary trigger means operable in a set state to secure said carriage means relative to said housing means and operable in a triggered state to release said carriage means;
   thrust spring means for expelling said jaw carriage means from said housing means in response to release of said carriage means by said primary trigger means; and,
   said jaw carriage means comprising:
      a pair of cooperating jaw members pivotally moveable between a set position and a triggered position, at least a portion of said jaw members physically contacting said primary trigger means when the jaw members are disposed in a set position, whereby to activate same in response to animal contact;
      jaw spring means operable when released for forcing said jaw members into said triggered position;
      jaw spring catch means for yieldably maintaining said jaw spring means in a set position; and,
      said jaw members comprising means for inertially contacting said jaw spring means in response to expulsion of said jaw carriage means, whereby to trigger said jaw members.

2. The combination as defined in claim 1 wherein:
   each of said jaw members includes guide boss means extending outwardly from opposite terminal ends thereof; and,
   said trap includes jaw member synchronizing means comprising:
      plate means adapted for reciprocal movement within said jaw carriage means; and,
      follower slot means defined in said plate means adapted to receive said guide boss means whereby to concurrently control movement of said jaw members.

3. The combination as defined in claim 2 wherein said primary trigger means comprises:
   first trigger lever means biased toward a set position and adapted to be contacted by said jaw members when an animal pressures said jaw members for actuating said primary trigger means;
   dog means for temporarily restraining said carriage means within said housing means; and,
   means for operably coupling said first trigger lever means to said dog means whereby to release said carriage means in response to said first trigger lever means.

4. The combination as defined in claim 3 wherein:

said primary trigger means comprises a mounting frame rigidly secured within said trap housing;

said first trigger lever means includes a major portion thereof pivotally secured within said trigger mounting frame and a vertical portion thereof extending outwardly of said trigger mounting frame for contact by said jaw members; and, said means operably coupling said first trigger lever means to said dog means comprises:

second trigger lever means pivotally secured within said trigger mounting frame and having a forward end coupled to said first trigger lever and a rear end; and, third trigger lever means coupled to said second trigger lever means rear end and operable to rotate said dog means to release said jaw carriage means.

5. The combination as defined in claim 4 wherein said jaw carriage means comprises retention boss means adapted to be releasably restrained by said dog means when said trap is in said set position.

6. The combination as defined in claim 1 wherein said jaw spring means comprise terminal loop portions adapted to be received through set slots defined in said carriage, and said jaw spring catch means comprises pin means for temporarily engaging said terminal loop portions to temporarily restrain said jaw spring means in a set position.

7. The combination as defined in claim 6 wherein said pin means are yieldably biased toward an unengaged position relative to said jaw spring terminal loop portions.

8. The combination as defined in claim 1 wherein said primary trigger means comprises:

first trigger lever means biased toward a set position and adapted to be contacted by said jaw members when an animal pressures said jaw members for actuating said primary trigger means;

dog means for temporarily restraining said carriage means within said housing means; and, means for operably coupling said first trigger lever means to said dog means whereby to release said carriage means in response to said first trigger lever means.

9. The combination as defined in claim 8 wherein:

said primary trigger means comprises a mounting frame rigidly secured within said trap housing;

said first trigger lever means includes a major portion thereof pivotally secured within said trigger mounting frame and a vertical portion thereof extending outwardly of said trigger mounting frame for contact by said jaw members; and, said means operably coupling said first trigger lever means to said dog means comprises:

second trigger lever means pivotally secured within said trigger mounting frame and having a forward end coupled to said first trigger lever and a rear end; and, third trigger lever means coupled to said second trigger lever means rear end and operable to rotate said dog means to said jaw carriage means.

10. The combination as defined in claim 9 wherein said jaw carriage means comprises retention boss means adapted to be releasably restrained by said dog means when said trap is in said set position.

11. The combination as defined in claim 9 including means for synchronizing operation of said jaw members.

12. The combination as defined in claim 11 wherein:

each of said jaw members includes guide boss means extending outwardly from opposite terminal ends thereof; and, said jaw member synchronizing means comprises:

plate means adapted for reciprocal movement within said jaw carriage means; and, follower slot means defined in said plate means adapted to receive said guide boss means whereby to concurrently control movement of said jaw members.

13. The combination as defined in claim 1 wherein:

said housing means includes first thrust spring bracket means;

said carriage means includes second thrust spring bracket means adapted to be aligned in spaced relation relative to said first thrust spring bracket means when said trap is set; and, said thrust spring means is releasably secured between said first thrust spring bracket means and said second thrust spring bracket means.

14. The combination as defined in claim 13 including thrust spring housing means adapted to be coaxially disposed about said thrust spring means between said first thrust spring bracket means and said second thrust spring bracket means.

15. The combination as defined in claim 14 including chain means for allowing maximum travel of said carriage means relative to said housing means while ultimately securing said jaw or carriage means relative to said trap.

16. The combination as defined in claim 15 wherein said chain means is attached to said second thrust bracket means and includes a terminal end adapted to be secured to a stationary object to prevent locomotion of a captured animal beyond the length of said chain means.

17. An aminal trap comprising:

rigid, box-like housing means adapted to be concealed in an area likely to be visited by a target animal;

separate box-like, rigid jaw carriage means adapted to be releasably received within said housing means for capturing a target animal;

dog means operable in a set state to secure said carriage means relative to said housing means;

trigger means responsive to animal contact for releasing said dog means to free said carriage means;

thrust spring means for expelling said jaw carriage means from said housing means in response to release of said dog means;

said jaw carriage means comprising:

a pair of cooperating jaw members pivotally moveable between an untensioned set position and a triggered position;

jaw spring means operable when released for forcing said jaw members into said triggered position;

jaw spring catch means for yieldably maintaining said jaw spring means in a set position; and, means for disabling said jaw spring catch means in response to expelling of said jaw carriage means thereby triggering said jaw members.

18. The combination as defined in claim 17 wherein:

each of said jaw members includes guide boss means extending outwardly from opposite terminal ends thereof; and, said trap includes jaw member synchronizing means comprising:
  plate means adapted for reciprocal movement within said jaw carriage means; and,
  follower slot means defined in said plate means adapted to receive said guide boss means whereby to concurrently control movement of said jaw members.

19. The combination as defined in claim 17 wherein said trigger means comprises:
  first trigger lever means biased toward a set position and adapted to be contacted by said jaw members when an animal pressures said jaw members for actuating said trigger means; and,
  means for operably coupling said first trigger lever means to said dog means whereby to release said carriage means in response to said first trigger lever means.

20. The combination as defined in claim 19 wherein:
  said trigger means comprises a mounting frame rigidly secured within said trap housing means;
  said first trigger lever means includes a major portion thereof pivotally secured within said trigger mounting frame and a vertical portion thereof extending outwardly of said trigger mounting frame for contact by said jaw members; and,
  said means operably coupling said first trigger lever means to said dog means comprises:
    second trigger lever means pivotally secured within said trigger mounting frame and having a forward end coupled to said first trigger lever and a rear end; and,
    third trigger lever means coupled to said second trigger lever means rear end and operable to rotate said dog means to release said jaw carriage means.

21. The combination as defined in claim 20 wherein said jaw carriage means comprises retention boss means adapted to be releasably restrained by said dog means when said trap is in said set position.

22. The combination as defined in claim 17 wherein said jaw spring means comprises terminal loop portions adapted to be received through set slots defined in said carriage means, said jaw spring catch means comprises pin means for temporarily engaging said terminal loop portions to temporarily restrain said jaw spring means in a set position, and said means for disabling said jaw spring catch means in response to expelling of said jaw carriage means comprises an intermediate portion of said jaw spring means adapted to be inertially contacted by said jaw members after actuation of said trigger means, whereby to release said terminal loop portions and said jaw spring means.

23. The combination as defined in claim 22 wherein said pin means are yieldably biased toward an unengaged position relative to said jaw spring terminal loop portions whereby to cooperate with said jaw spring intermediate portions and encourage triggering of said jaw members.

24. The combination as defined in claim 17 including means for tensioning said trigger means and adjustment means for varying tension provided by said tensioning means.

25. A binary animal trap comprising:
  rigid, generally cubicle housing means adapted to be positioned in an area likely to be visited by target animals, the housing means including first thrust spring bracket means;
  separate, rigid, generally cubicle jaw carriage means adapted to be releasably received within said housing means for capturing a target animal, said carriage means including second thrust spring bracket means adapted to be aligned in spaced relation relative to said first thrust spring bracket means when said trap is set;
  thrust spring means secured between said first and second thrust spring bracket means for expelling said jaw carriage means from said housing means when said trap is triggered;
  means operable in a set state to secure said carriage means within said housing means against predetermined tension from said thrust spring means;
  trigger means responsive to animal contact for releasing said means operable in a set state to secure said carriage means whereby to trigger said trap by freeing said carriage means;
  said jaw carriage means comprising:
    a pair of cooperating jaw members pivotally moveable between an untensioned set position and a triggered position;
    jaw spring means operable when released for forcing said jaw members into said triggered position;
    jaw spring catch means for yieldably maintaining said jaw spring means in a set position; and,
    means for disabling said jaw spring catch means in response to expelling of said jaw carriage means thereby triggering said jaw members; and,
  chain means for allowing maximum travel of said carriage means relative to said housing means while ultimately securing said carriage means relative to said housing means, said chain means being attached to said second thrust bracket means and including a terminal end adapted to be secured to a stationary object to prevent locomotion of a captured animal beyond the length of said chain means.

26. The combination as defined in claim 25 including thrust spring housing means adapted to be coaxially disposed about said thrust spring means between said first thrust spring bracket means and said second thrust spring bracket means.

27. The combination as defined in claim 25, wherein said means for disabling said jaw spring catch means in response to expelling of said jaw carriage means from said housing means comprises a portion of said jaw spring means inertially contacted by said jaw members in response to movement of said carriage means.

* * * * *